(12) United States Patent
Liu

(10) Patent No.: US 6,641,544 B2
(45) Date of Patent: Nov. 4, 2003

(54) BODY TEMPERATURE MONITORING DEVICE

(76) Inventor: Hsiang-Ling Liu, No. 92, Hsin-Hsing Rd., Tung-Men Tsun, Pu-Hsin Hsiang, Chang-Hua Hsien (TW)

( * ) Notice: Subject to any disclaimer, the term of this patent is extended or adjusted under 35 U.S.C. 154(b) by 0 days.

(21) Appl. No.: 10/021,500

(22) Filed: Dec. 19, 2001

(65) Prior Publication Data

US 2003/0114771 A1 Jun. 19, 2003

(51) Int. Cl.[7] .............................................. A61B 5/00
(52) U.S. Cl. ...................................... 600/549; 374/100
(58) Field of Search ................................ 600/300, 301, 600/549; 374/100, 141, 142, 170, 183, 185, 208

(56) References Cited

U.S. PATENT DOCUMENTS

| | | | | |
|---|---|---|---|---|
| 4,090,504 A | * | 5/1978 | Nathan | 600/483 |
| 4,747,413 A | * | 5/1988 | Bloch | 600/549 |
| 5,938,619 A | * | 8/1999 | Dogre Cuevas | 600/549 |
| 6,238,354 B1 | * | 5/2001 | Alvarez | 600/549 |
| 6,458,087 B1 | * | 10/2002 | Al-Rasheed | 600/549 |
| 2002/0065454 A1 | * | 5/2002 | Lebel et al. | 600/365 |

FOREIGN PATENT DOCUMENTS

JP     61142431 A   *   6/1986   ............ G01K/7/00

* cited by examiner

*Primary Examiner*—Charles Marmor, II
(74) *Attorney, Agent, or Firm*—Dickinson Wright PLLC

(57) ABSTRACT

A body temperature monitoring device includes a processor unit connected electrically to a temperature detecting unit, a data storage unit, a display unit, and a control key unit. The control key unit is operable so as to control the processor unit to store periodically both temperature information corresponding to a digital temperature signal from the temperature detecting unit, and storage time information associated with the temperature information in the data storage unit. The control key unit is further operable to control the processor unit to retrieve the temperature information and the storage time information from the data storage unit, and to enable the processor unit to control the display unit to show the temperature information and the storage time information.

6 Claims, 6 Drawing Sheets

BODY TEMPERATURE MONITORING DEVICE

BACKGROUND OF THE INVENTION

1. Field of the Invention

This invention relates to a body temperature monitoring device, and more particularly relates to a body temperature monitoring device which includes a control key unit that is operable to control a processor unit to store and retrieve temperature information and storage time information and to show the same on a display unit.

2. Description of the Related Art

A conventional hand-held electronic thermometer usually includes a probe which is applied to a patient such that the probe temperature rises to the body temperature of the patient. However, no means is provided for monitoring and recording the body temperature of the patient at predetermined time intervals.

SUMMARY OF THE INVENTION

The object of the present invention is to provide a body temperature monitoring device which can monitor and record the body temperature of a patient at predetermined time intervals and which can show the temperature information thereon.

According to this invention, the body temperature monitoring device comprises a temperature detecting unit, a data storage unit, a display unit, a processor unit, and a control key unit. The temperature detecting unit includes a temperature sensitive element adapted to be placed in contact with a human body part so as to generate a digital temperature signal corresponding to the temperature sensed by the temperature sensitive element. The processor unit is connected electrically to the temperature detecting unit, the data storage unit and the display unit. The control key unit is connected electrically to the processor unit. The control key unit is operable so as to control the processor unit to store periodically both temperature information corresponding to the digital temperature signal from the temperature detecting unit, and storage time information associated with the temperature information in the data storage unit. The control key unit is further operable so as to control the processor unit to retrieve the temperature information and the storage time information from the data storage unit, and so as to enable the processor unit to control the display unit to show the temperature information and the storage time information retrieved by the processor unit on the display unit.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENT

Figure 1:
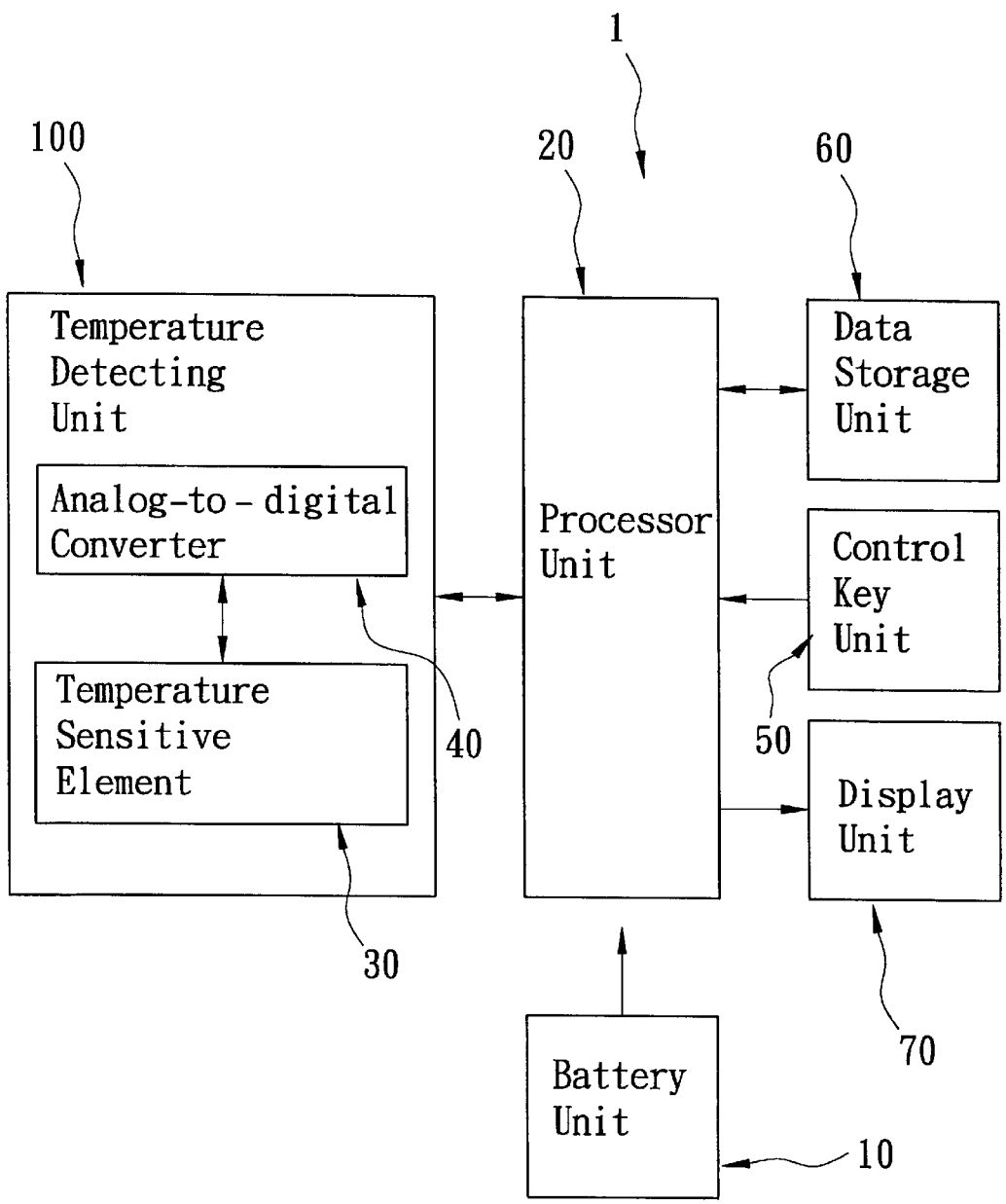
FIG. 1 is a schematic circuit block diagram illustrating the first preferred embodiment of this invention.
Figure 2:
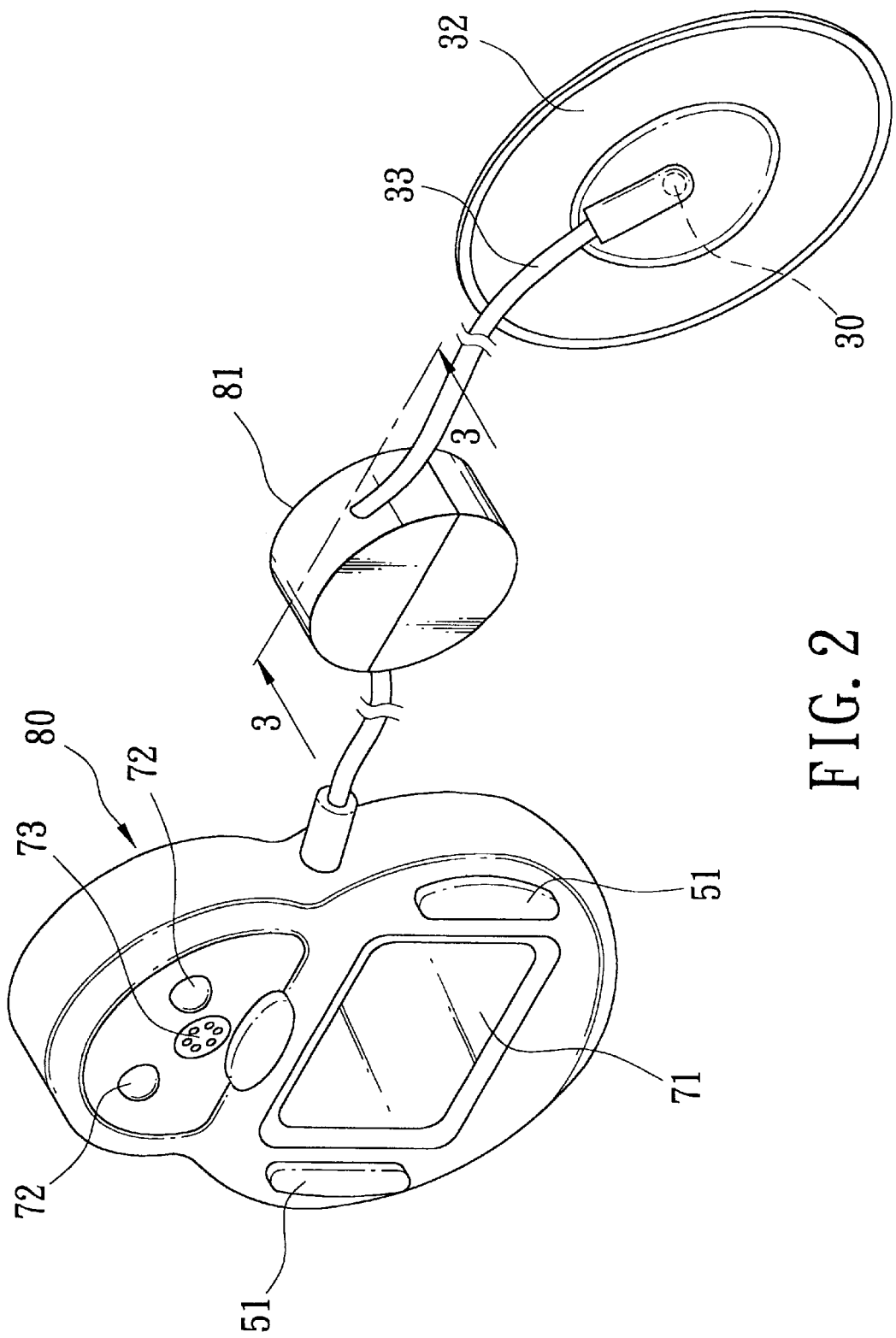
FIG. 2 is a perspective view of the first preferred embodiment.

Referring to FIGS. 1 and 2, the first preferred embodiment of the body temperature monitoring device 1 according to the present invention is shown to comprise a battery unit 10, a temperature detecting unit 100, a data storage unit 60, a display unit 70, a processor unit 20, and a control key unit 50.

The temperature detecting unit 100 includes a temperature sensitive element 30 and an analog-to-digital converter 40. In this embodiment, the temperature sensitive element 30 is a thermistor. A body contact pad 32 has the temperature sensitive element 30 mounted thereon and is to be attached releasably on a human body part. The analog-to-digital converter 40 is connected electrically to the temperature sensitive element 30 by an electric cable 33, and to the processor unit 20 so as to generate a digital temperature signal corresponding to temperature sensed by the temperature sensitive element 30. The digital temperature signal is obtained by the processor unit 20 from the analog-to-digital converter 40.

A housing 80 is provided to accommodate the data storage unit 60, the processor unit 20 and the analog-to-digital converter 40 therein. The display unit 70 and the control key unit 50, which include an LCD monitor 71 and a plurality of keys 51, are mounted on the housing 80. The electric cable 33 has a first end which extends into the housing 80 to connect electrically with the analog-to-digital converter 40, and a second end which extends to the body contact pad 32 to connect electrically with the temperature sensitive element 30. In addition, an alarm unit includes a plurality of indicator lamps 72 and a buzzer 73 which are connected to and which are controlled by the processor unit 20.

Figure 3:
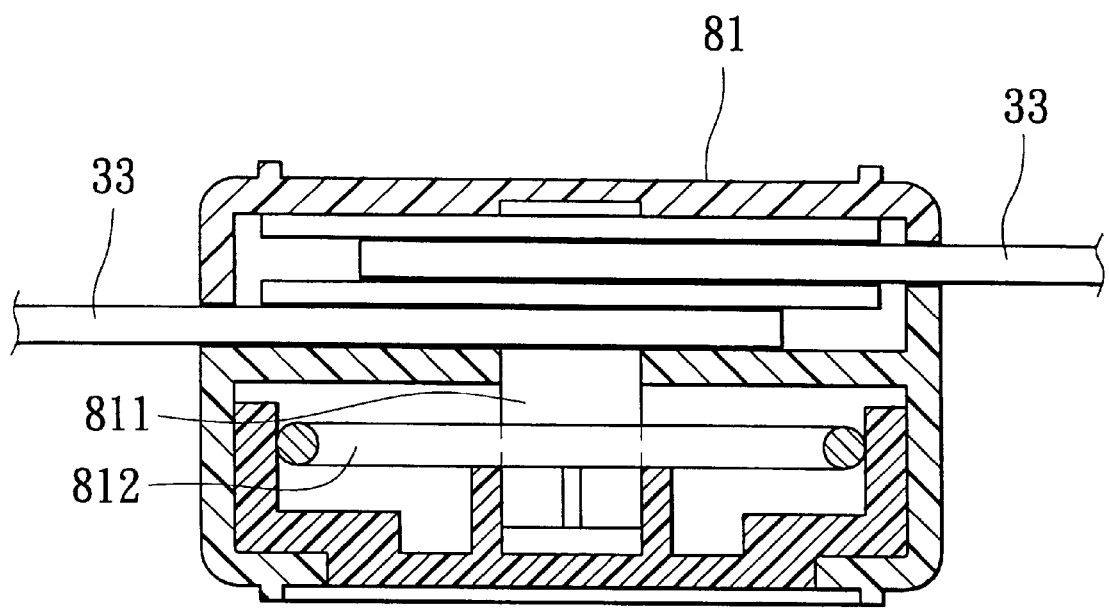
FIG. 3 is a sectional schematic view of a spring-loaded cable reel of the first preferred embodiment, taken along lines 3—3 of FIG. 2.

Preferably, with reference to FIG. 3, a spring-loaded cable reel 81 is disposed on an intermediate part of the electric cable 33, and includes a shaft 811 for winding the electric cable 33, and a coil spring 812 which is sleeved on the shaft 811 to rotate the shaft 811 so as to wind releasably the electric cable 33 in a known manner.

Figure 4:
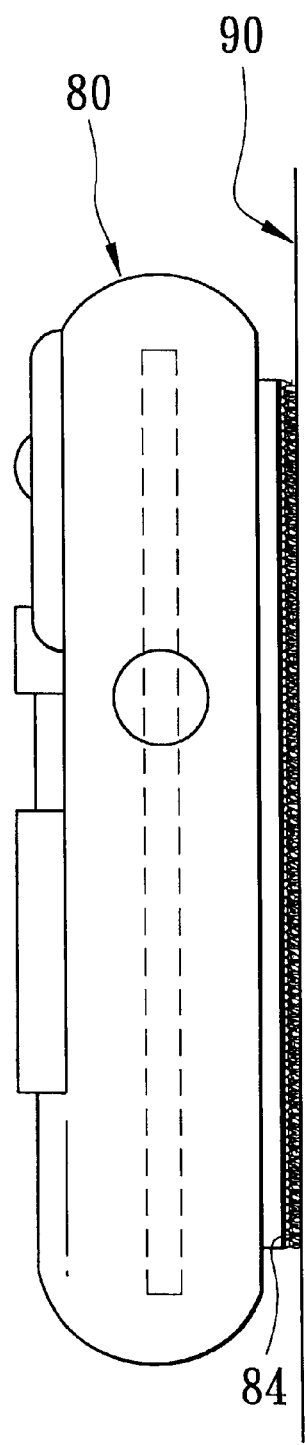
FIG. 4 is a side view of a housing of the first preferred embodiment.
Figure 5:
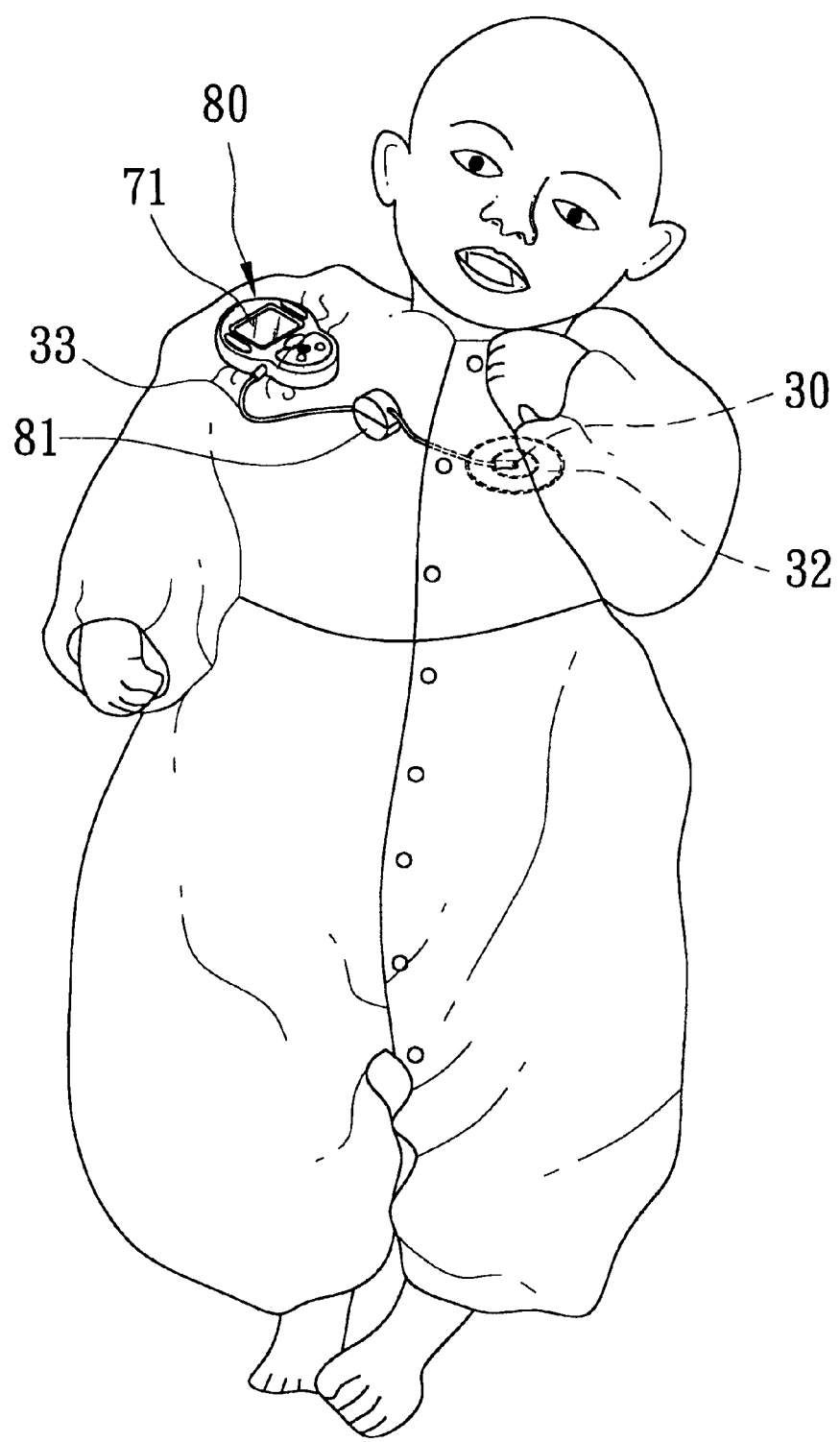
FIG. 5 is a schematic view illustrating the device of FIG. 2 when applied to a child whose body temperature is to be monitored.

Preferably, and with reference to FIGS. 4 and 5, a fabric fastener 84 is mounted on the housing 80 so as to fasten the housing 80 on a piece of cloth 90 on a bed or on a piece of clothing of a child.

In use, the body contact pad 32 is attached on a body part of a child, and the keys 51 are pressed to set predetermined time intervals and a temperature threshold. The processor unit 20 automatically stores both temperature information corresponding to the digital temperature signal from the temperature detecting unit 100, and storage time information associated with the temperature information in the data storage unit 60 at the predetermined time intervals. Further, the processor unit 20 can be controlled upon operation of the keys 51 to retrieve the temperature information and the storage time information from the data storage unit 60, and to control the display unit 70 to show the temperature information and the storage time information on the display unit 70.

Upon detection by the processor unit 20 that the digital temperature signal has reached the predetermined temperature threshold, the processor unit 20 activates the indicator lamps 72 and the buzzer 73 to generate visible and audible alarm outputs, thereby alerting the guardian of the need to attend to the child immediately.

As illustrated, since the body temperature monitoring device of this invention records periodically the body temperature of a patient that can be shown on the LCD monitor 71 of the display unit 70, the body temperature of the patient can be monitored conveniently.

Figure 6:
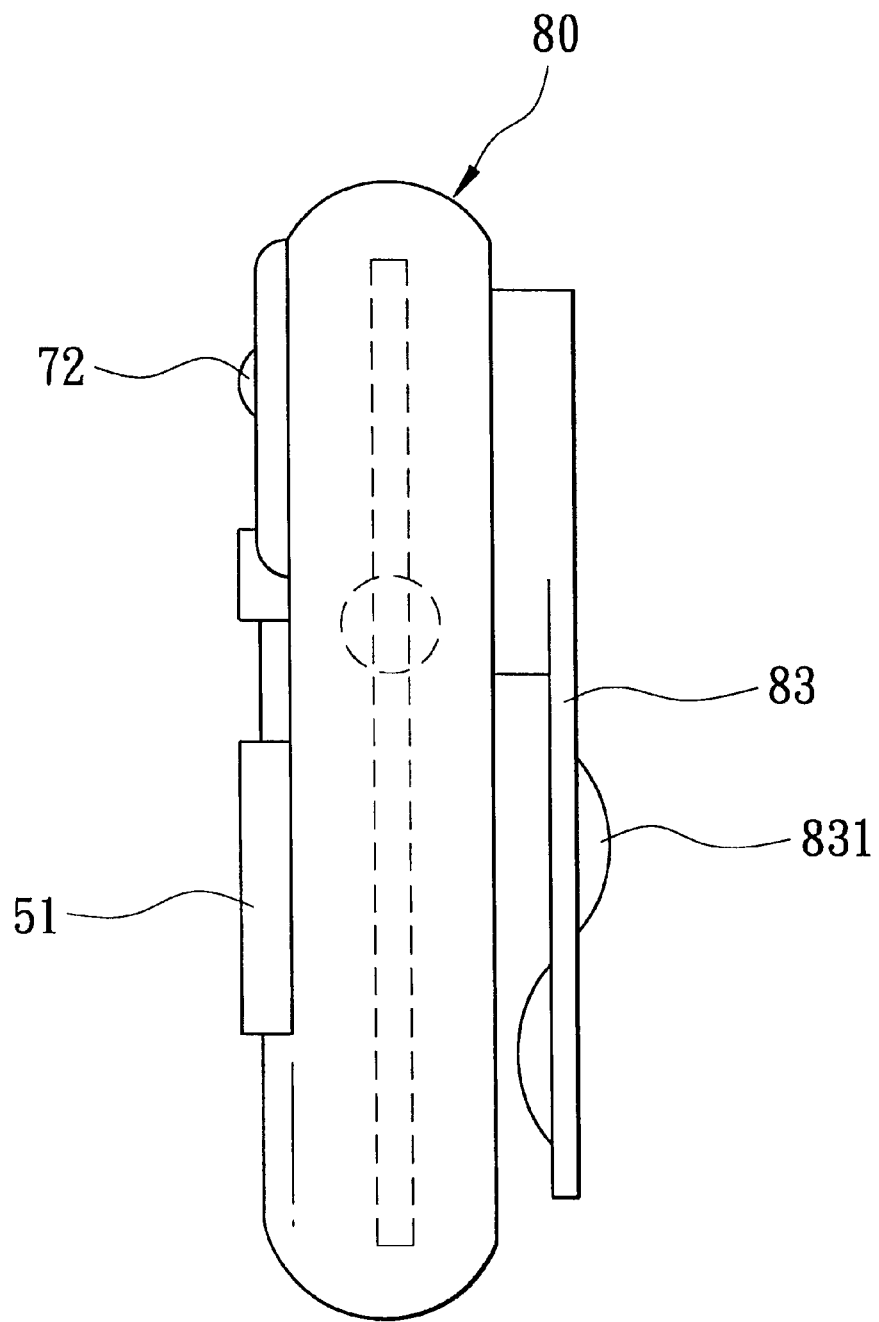
FIG. 6 is a side view of a housing of a second preferred embodiment of this invention.

Referring to FIG. 6, the second preferred embodiment of this invention is shown to include a clip 83 which is mounted on the housing 80 (instead of the fabric fastener of the first embodiment) so as to clip the housing 80 on a piece of garment worn by a patient. In addition, the temperature sensitive element 831 is mounted on the clip 83 so as to be placed in contact with the body part of the patient.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

I claim:

1. A body temperature monitoring device comprising:

a temperature detecting unit including a temperature sensitive element adapted to be placed in contact with a human body part, said temperature detecting unit generating a digital temperature signal corresponding to temperature sensed by said temperature sensitive element;

a data storage unit;

a display unit;

a processor unit connected electrically to said temperature detecting unit, said LA data storage unit and said display unit;

a control key unit connected electrically to said processor unit;

said control key unit being operable so as to control said processor unit to store periodically both temperature information corresponding to said digital temperature signal from said temperature detecting unit, and storage time information associated with said temperature information in said data storage unit;

said control key unit being further operable so as to control said processor unit to retrieve said temperature information and said storage time information from said data storage unit, and so as to enable said processor unit to control said display unit to show said temperature information and said storage time information retrieved by said processor unit on said display unit;

wherein said temperature detecting unit comprises an analog-to-digital converter connected electrically to said temperature sensitive element and said processor unit, said digital temperature signal being obtained by said processor unit from said analog-to-digital converter;

a housing having said data storage unit, said processor unit and said analog-to-digital converter mounted therein, and having said display unit and said control key unit mounted thereon; and a clip mounted on said housing, said temperature sensitive element being mounted on said clip.

2. The body temperature monitoring device as claimed in claim 1, wherein said processor unit automatically stores said temperature information and said storage time information in said data storage unit at predetermined time intervals, said predetermined time intervals being set by said control key unit.

3. The body temperature monitoring device as claimed in claim 1, further comprising an alarm unit connected to and controlled by said processor unit so as to generate an alarm output upon detection by said processor unit that said digital temperature signal has reached a predetermined temperature threshold.

4. The body temperature monitoring device as claimed in claim 3, wherein said alarm unit includes an indicator lamp.

5. The body temperature monitoring device as claimed in claim 3, wherein said alarm unit includes a buzzer.

6. The body temperature monitoring device as claimed in claim 3, wherein said control key unit is further operable so as to set the predetermined temperature threshold in said processor unit.

* * * * *